(No Model.)
A. BOULIER.
PYROMETER.
No. 300,202. Patented June 10, 1884.
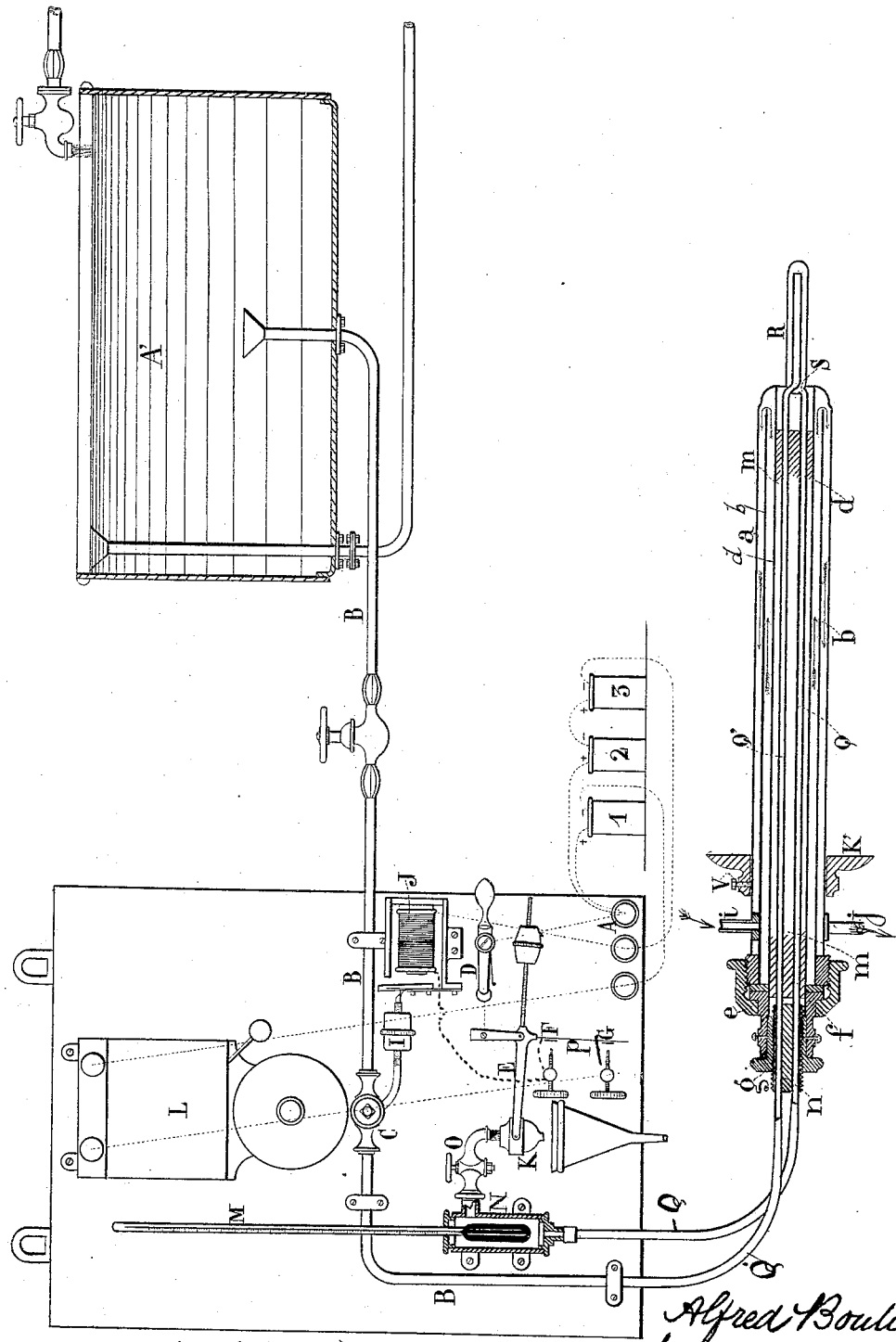

UNITED STATES PATENT OFFICE.

ALFRED BOULIER, OF PARIS, FRANCE.

PYROMETER.

SPECIFICATION forming part of Letters Patent No. 300,202, dated June 10, 1884.

Application filed January 21, 1884. (No model.) Patented in France March 3, 1883, No. 154,067; in Belgium March 29, 1883, No. 60,911; in Germany March 31, 1883, No. 25,280; in England April 4, 1883, No. 1,698, and October 5, 1883, No. 4,751; in Austria-Hungary October 18, 1883; in Italy October 23, 1883, and in Spain October 30, 1883.

*To all whom it may concern:*

Be it known that I, ALFRED BOULIER, of Paris, in the Republic of France, have invented a new and useful Improvement in Pyrometers, which improvement is fully set forth in following specification.

This invention relates more particularly to instruments for measuring very high temperatures, to the measurement of which ordinary thermometers (operating by the expansion of an inclosed liquid) are ill or not at all suited; but it may be applied in whole or in part to the measurement of lower temperatures whenever desired.

In the invention use is made of a current of any suitable liquid, which is exposed for a short time to the temperature to be measured. The rise of temperature in the flowing liquid (to be measured in any ordinary or suitable way—as, for example, by the common mercurial thermometer) will indicate the degree of heat to which the circulation is exposed. The higher this degree, of course, the greater is the amount of heat absorbed by the flowing liquid and the greater its rise in temperature.

It is not new, broadly, to make use of a current in this way.

Heretofore in a pyrometer operating by means of such a current two thermometers have been used—one to mark the temperature of the fluid flowing into the tube or chamber where it is subjected to the heat, and the other the temperature as it flows out of the same; and from the difference the intensity of the heat measured is calculated.

The present invention consists in providing means for maintaining constant the temperature of the inflowing fluid, and in combining with such means and the conveying-tubes and other parts of the apparatus a thermometer which may be graduated so as to express in degrees, at least approximately, the temperature to which the current is exposed.

The invention further comprises certain special improvements and combinations of parts, as hereinafter set forth and claimed.

What is considered the best mode of applying the principle of the invention will now be explained, with the aid of the accompanying drawing, which illustrates, partly in elevation and partly in vertical section, an instrument or pyrometer constructed in accordance with the invention.

From an elevated tank, A', the liquid (water, for example,) flows through the tube B into the tube Q', which delivers it into the interior of a closed capsule or chamber, R, near the outer end thereof. A tube, Q, communicating with the opposite end of the capsule at S, carries off the liquid and delivers it into the bottom of chamber N. It flows off at the top of the chamber by the cock O. A thermometer, M, has its bulb immersed in the liquid in the chamber N, so as to indicate the temperature of the escaping liquid. The liquid in the tank A' is maintained at a constant level by an overflow or otherwise, and also at a uniform temperature by any suitable means. When water is the liquid used, a temperature of, say, zero centigrade may be maintained by having always a block of ice floating in the liquid. The walls of the capsule R are or may be made of thin metal, (platinum preferred,) so as to transfer the heat rapidly to the liquid within. It is of course desirable to protect the current from external influences tending to heating and cooling the same, except while in the capsule R, and this is specially desirable for those parts near the capsule where the external temperature will necessarily approximate that to be measured. The tubes B Q Q', therefore, are or may be protected with non-conducting or heat-insulating material. The parts near the capsule are further protected by a jacket which surrounds the insulating or non-conducting covering $m$, of the pipes Q' Q, and through which a cooling-fluid is circulated. The jacket is composed of three concentric cylinders, $a\ b\ d$. The cooling-fluid is introduced by the pipe $i$ into the space between the cylinders $b$ and $d$, flows to the farther end of the jacket, returns in the space between the cylinders $a$ and $b$, and escapes by the pipe $j$.

In order that the exposed surface of the capsule R may be regulated, it can be withdrawn more or less into the jacket $a\ b\ d$. For this purpose the tubes Q Q' pass through and are fixed in a screw, $n$, which is engaged by a nut, $g$, which can be turned so as to move the said screw, and with it the tubes Q Q' and capsule R, in or out. The nut $g$ is supported within the sleeve $f$, which is held in place by the cap $e$.

In use the instrument is set into the furnace-wall up to the collar K', which can itself be held by the set-screw V in any desired position on the cylinder $a$.

In order to ascertain the temperature it is only necessary to consult the thermometer M. The higher it stands the higher the temperature to which the capsule R is exposed, provided the other elements remain the same. The principal of the other elements are the original temperature of the liquid in the tank A', the cross-section and rapidity of the current, and the surface exposed in the capsule R.

By a sufficient series of experiments a formula or formulæ may be obtained in which is expressed the effect upon the thermometer of each of these, as well as that of any increase in the temperature to which the capsule is exposed. Practically, however, these elements may be eliminated by rendering them constant. The position at which the mercury stands in the thermometer M for two or more known temperatures may then be ascertained experimentally, and the temperatures which correspond to the other positions be calculated therefrom.

It is preferred to graduate the thermometer in the following way: The liquid in the tank A' being maintained at zero centigrade, the capsule R is exposed to the same temperature, and the current is allowed to flow until the mercury column comes to rest. The point is marked with the zero of the scale. The capsule R is then placed in a steam-bath having a constant temperature of 100° centigrade, and when the mercury column comes to rest the point is marked 1 or 10, or whatever may be desired. The graduation is then continued. These graduations will indicate, at least approximately, the temperature to which the capsule R is exposed, provided, of course, the temperature of the inflowing liquid, the current, and the projection of the capsule R remain unchanged. The constancy of the temperature in the vat A' and of the projection of the capsule can readily be secured.

To guard against dangers which might arise from the diminution of the flow, an automatic alarm is provided, and also a cut-off for shutting off the current whenever the latter, for any reason, is lessened. The liquid from the cock O falls into the cup K, supported at the end of a pivoted beam, E. A funnel below the cup finally carries off the liquid. The weight of the cup K, the water contained in it, and the impact of the steam are balanced by an adjustable weight on the opposite side of the pivot. When the stream diminishes, the downward pressure on the cup K is relieved, it rises, the beam tilts, and a depending spring-arm, $p$, makes contact with the screw G, and thereby closes the circuit of the cell 1 through the bell or alarm L. A further rise of the cup causes the spring $p$ to make contact with the screw F, and thus to close the circuit of the cells 2 and 3 through the electro-magnet J. This magnet then attracts its armature, withdrawing the projection on its back from under the end of weighted arm I, which thereupon falls and closes the cock C, so as to stop the flow of the liquid.

The object of cutting off the flow is to prevent the destructive generation of steam or vapor which might take place if the flow were to continue in such diminished quantities that it should become heated above the boiling-point in the capsule R, and also to avoid wasting the fluid. The circuits of the cell 1 and cells 2 and 3 are in common from the binding-post A through the switch D to beam E and spring-arm $p$.

It is evident that portions of the invention may be used separately, and that modifications may be made in details.

Having now fully described the said invention and the manner of carrying the same into effect, what I claim is—

1. In a pyrometer operating by means of a current of fluid exposed for a short time to the action of the heat to be measured, and in which the initial temperature of the said fluid is maintained constant, the combination, with the conveying-pipes and capsule, of a thermometer graduated to express the degree of said heat, the bulb of said thermometer being immersed in said fluid, substantially as described.

2. The combination, with the capsule and the inlet and outlet pipes leading to and from the same, of the jacket closely surrounding the said pipes and protecting them from the heat to which the capsule is exposed, substantially as described.

3. The combination, with the capsule and the inlet and outlet pipes, of the water-jacket surrounding said pipes, substantially as described.

4. The combination, with the capsule, the inlet and outlet pipes leading to and from the same, and the protecting-jacket, of adjusting means for withdrawing the capsule more or less into said jacket, substantially as described.

5. The electric balance comprising a device to receive the impact of a stream of liquid and a counter-weight adjusted to balance the force exerted by said impact, in combination with contacts connected with said balance for closing an electric circuit, substantially as described, said balance remaining in equilibrium under a normal flow of the liquid, but turning to operate said contacts and change the circuit-connections when a change takes place in said flow, as set forth.

6. The combination, with a pyrometer wherein a flow of liquid is maintained, of an automatic alarm comprising a balance arranged to be acted upon by the flowing liquid, a signal or alarm, and devices connecting the alarm with said balance, so as to be operated thereby, for indicating a diminution in the flow, substantially as described.

7. The combination, with a pyrometer wherein a flow of liquid is maintained, of an automatic stop-cock comprising a cock or valve, a balance arranged to be acted upon by the flowing liquid, and devices connecting the cock or valve with said balance, so as to be operated thereby, for cutting off the flow upon the diminution of the same, substantially as described.

In testimony whereof I have signed this specification in the presence of two subscribing witnesses.

ALFRED BOULIER.

Witnesses:
G. DUPONT,
J. ROBELET.